US008239665B2

(12) United States Patent
Liu et al.

(10) Patent No.: US 8,239,665 B2
(45) Date of Patent: Aug. 7, 2012

(54) METHODS, SYSTEMS AND MEDIA FOR CONFIGURING BOOT OPTIONS

(75) Inventors: Wei Liu, Austin, TX (US); William Carl Munger, Austin, TX (US); Ching-Lung Chao, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 949 days.

(21) Appl. No.: 11/933,410

(22) Filed: Oct. 31, 2007

(65) Prior Publication Data

US 2009/0113198 A1  Apr. 30, 2009

(51) Int. Cl.
G06F 9/00 (2006.01)
G06F 9/24 (2006.01)
G06F 15/177 (2006.01)
G06F 1/24 (2006.01)

(52) U.S. Cl. .................. 713/2; 713/1; 713/100
(58) Field of Classification Search .............. 713/1, 2
See application file for complete search history.

(56) References Cited

U.S. PATENT DOCUMENTS

| | | | |
|---|---|---|---|
| 6,292,890 B1 | 9/2001 | Crisan | |
| 6,466,972 B1 * | 10/2002 | Paul et al. | 709/222 |
| 6,658,562 B1 | 12/2003 | Bonomo et al. | |
| 6,944,789 B2 | 9/2005 | Kodama | |
| 7,111,202 B2 | 9/2006 | Cagle et al. | |
| 7,269,721 B2 | 9/2007 | McCardle | |
| 7,293,165 B1 * | 11/2007 | Tobias | 713/1 |
| 2003/0005276 A1 * | 1/2003 | French et al. | 713/2 |
| 2003/0126202 A1 * | 7/2003 | Watt | 709/203 |
| 2004/0078679 A1 | 4/2004 | Cagle et al. | |
| 2004/0130557 A1 * | 7/2004 | Lin et al. | 345/619 |
| 2005/0216757 A1 | 9/2005 | Gardner | |
| 2006/0168564 A1 | 7/2006 | Zhang et al. | |
| 2006/0179294 A1 * | 8/2006 | Chu et al. | 713/2 |
| 2006/0242396 A1 * | 10/2006 | Cartes et al. | 713/1 |
| 2006/0272020 A1 | 11/2006 | Gardner | |
| 2006/0282652 A1 | 12/2006 | El-Haj-mahmoud et al. | |
| 2007/0168481 A1 | 7/2007 | Lambert et al. | |
| 2007/0168498 A1 | 7/2007 | Lambert et al. | |
| 2009/0006534 A1 * | 1/2009 | Fries et al. | 709/203 |

* cited by examiner

*Primary Examiner* — Kim Huynh
*Assistant Examiner* — Brandon Kinsey
(74) *Attorney, Agent, or Firm* — Baker Botts L.L.P.

(57) ABSTRACT

Implementations described herein generally provide methods of configuring boot options. One method may generally include receiving on a remote management information handling system (IHS), boot information relating to a remotely configured HIS, using the boot information on the remote management IHS to create boot options and sending the boot options from the remote management IHS to the remotely configured IHS.

16 Claims, 5 Drawing Sheets

| BOOT PRIORITY | IPL OR BCV | UNIQUE SIGNATURE | DEVICE DESCRIPTION STRING |
|---|---|---|---|
| 1 | IPL | 0xFFFFFF0B | SATA CD-ROM DEVICE |
| 2 | IPL | 0xFFFFFF05 | HARD DRIVE (C:) |
| 3 | IPL | 0x9C9AA0AF | FRONT USB: MEMORY KEY |
| 4 | IPL | 0x413C0002 | VIRTUAL FLOPPY |
| 5 | IPL | 0x413C0001 | VIRTUAL CD |
| 6 | IPL | 0x00010106 | EMBEDDED NIC 1 MBA V3.4.2 SLOT 0300 |
| 7 | IPL | 0x00020106 | EMBEDDED NIC 2 MBA V3.4.2 SLOT 0500 |
| 1 | BCV | 0x9C6E94F5 | EMBEDDED HYPERVISOR: MULTI-CARD |
| 2 | BCV | 0x01050200 | SLOT 5 #0600 ID00 LUN0 SEAGATE ST973402SS |

METHODS, SYSTEMS AND MEDIA FOR CONFIGURING BOOT OPTIONS

BACKGROUND

1. Technical Field

The present disclosure relates generally to the field of information handling systems. More specifically, but without limitation, the present disclosure relates to remotely configuring boot options of an information handling system (IHS).

2. Background Information

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handing systems allow for such systems to be general or configured for a specific user or specific use such as financial transaction processing, airline reservations, enterprise data storage, or global communications. In addition: information handling systems may include a variety of hardware and software components that may be configured to process, store, and communicate information and may include one or more computer systems, data storage systems, and networking systems.

In some circumstances a plurality of information handling systems may be densely located within a single location. For example, an internet hosting company may place a large number of information handling systems (e.g., web servers) within a single location (e.g., within a single room) in order to respond to requests for information (e.g., serve web pages).

The information handling systems may be arranged to conserve space (e.g., rack mounted), and each information handling system may be provided without a dedicated keyboard, monitor, and/or mouse in order to further conserve space Instead of having a single keyboard, mouse and monitor for each information handling system, the information handling systems may be remotely monitored and remotely configured.

One standard for remote monitoring and remote management of information handling systems is the Intelligent Platform Management Interface (IPMI) Specification. The IPMI Specification provides a standard for remotely managing a plurality of information handling systems from a separate and remotely located information handling system (a remote management information handling system). An IPMI configured information handling system (a remotely configured information handling system) may contain a Baseboard Management Controller (BMC) which may monitor the remotely configured information handling system and may communicate with a remote management information handling system. The BMC may contain hardware and software which enables the BMC to operate independently of the hardware and software which controls the remotely configured information handling system.

In some circumstances a remotely configured information handling system may experience an error and may stop functioning, Consequently, the remotely configured information handling system may need to be restarted in order for the information handling system to regain functionality and in order for the error to be adequately diagnosed. The remote management information handling system may send commands to the BMC located within the remotely configured information handling system such that the BMC may reset or restart the remotely configured information handling system. In some circumstances resetting the remotely configured information handling system may solve the problem.

However, in some circumstances merely restarting the remotely configured information handling system may not resolve the problem occurring on the remotely configured information handling system. This may happen when a device in the remotely configured information handling system has ceased functioning. For example, a bootable device (e.g., a device containing programming code which boots or loads an operating system onto the remotely configured information handling system) may have stopped functioning. In this scenario, the remotely configured information handling system may need to be reconfigured in order to attempt a boot to a different device upon a restart or a reset of the system. A subsequent boot of the remotely configured information handling system to a different bootable device may allow the remotely configured information handling system to regain at least basic functionality and, consequently, may allow diagnosis of the error which occurred on the remotely configured information handling system.

Currently, IPMI and the BMC allow a user of a remote management information handling system to select a different boot device for the remotely configured information handling system to boot from. This option allows the user of the remote management IHS to specify that the remotely configured IHS boot from either the first available PXE device a default hard-drive device, a default CD/DVD device, or a diagnostic partition. Although in some circumstances a subsequent boot to the specified device may be successful, there is no verification on the remote management IHS that these devices or partitions are installed or located within the remotely configured IHS. Consequently, if the user of the remote management IHS selects a device (e.g., PXE device) for the remotely configured IHS to boot from but the device is not installed on the remotely configured IHS, the remotely configured IHS may not successfully boot to the desired device.

Thus, a need exists for methods and systems to remotely configure boot options in information handling systems.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides a method of configuring boot options. The method may generally include receiving on a remote management information handling system (IHS), boot information relating to a remotely configured IHS, using the boot information on the remote management IHS to create boot options and sending the boot options from the remote management IHS to the remotely configured IHS.

Another aspect of the disclosure provides a computer-readable medium containing computer executable instructions for performing a method. The method may generally include receiving boot information relating to a remotely configured information handling system on a remote management HIS, using the boot information on the remote management IRS to create boot options, sending the boot options from the remote management IRS to the remotely configured IRS and modifying the boot configuration of the remotely configured IHS based on the boot options.

Yet another illustrative aspect of the disclosure provides a remotely configured information handling system. The remotely configured IRS may generally include memory, a processor coupled to the memory and configured to send boot information to a baseboard management controller (BMC) installed in the remotely configured IHS, the BMC coupled to a communications network, wherein the BMC is configured to send the boot information via the communications network to a remote management IHS and wherein the remote management IHS may be configured to present the boot information to a user of the remote management IHS, accept input related to the boot information from the user of the remote management IHS, create boot options based on the input, and send the boot options to the BMC.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Portions of the present disclosure, detailed description and claims may be presented in terms of logic, software or software implemented aspects typically encoded on a variety of media or medium including, but not limited to, computer-readable media, machine-readable media, program storage media or computer program product. Such media may be handled, read, sensed and/or interpreted by an IHS (IHS). Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

Figure 1:
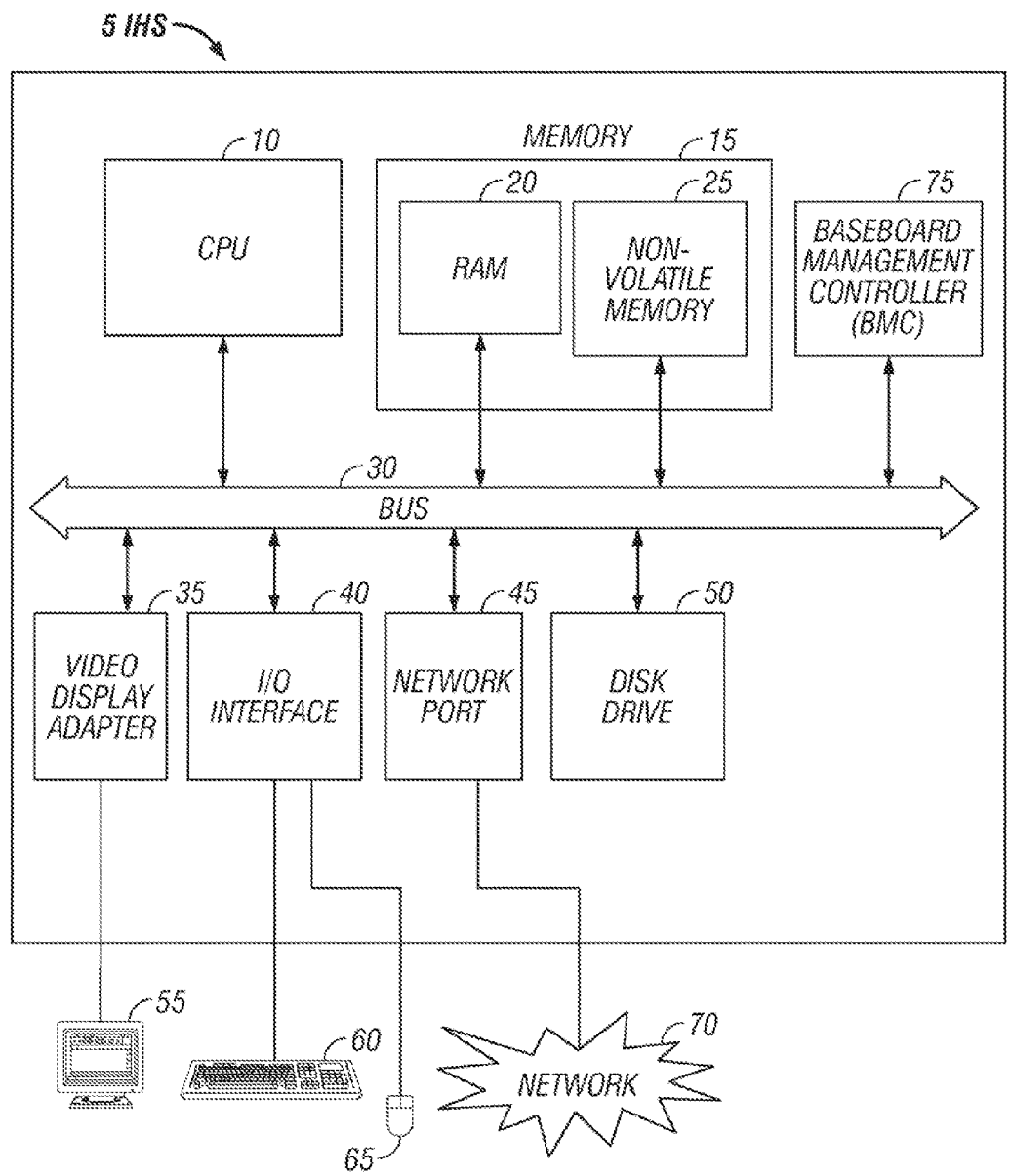
FIG. 1 illustrates a schematic of an information handling system according to the present disclosure.

FIG. 1 illustrates one possible implementation of an IHS 5 comprising a CPU 10. It should be understood that the present disclosure has applicability to IHSs as broadly described above, and is not intended to be limited to the IHS 5 as specifically described. The CPU 10 may comprise a processor, a microprocessor, minicomputer, or any other suitable device, including combinations and/or a plurality thereof, for executing programmed instructions. The CPU 10 may be in data communication over a local interface bus 30 with components including memory 15 and input/output interfaces 40. The memory 15, as illustrated, may include non-volatile memory 25. The non-volatile memory 25 may include, but is not limited to, firmware flash memory, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output devices not shown here. This type of firmware may be known as a basic/input output system (BIOS). The memory may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

The IHS 5 may also be implemented with a Baseboard Management Controller (BMC) 75. The BMC 75 may contain hardware and software which enables the BMC to operate independently of the hardware (e.g., processor) and software (e.g., operating system, BIOS, etc.) which controls the IHS 5. The BMC 75 may be electrically coupled to the local interface bus 30 in order to communicate with other devices within the IHS 5. The BMC 75 may also be electrically coupled to a plurality of sensors, fans, power connections, and the like within the IHS 5 such that the BMC 75 may collect information related to the operating conditions of the IHS 5. Additionally, the BMC 75 may be electrically coupled to a reset control of the IHS 5 such that the BMC 75 may reset or restart the IHS 5.

Additionally, the BMC 75 may be electrically coupled to the network port 45 within the IHS 5 to permit communication over the network 70 with a second IHS. Furthermore, the BMC 75 may be electrically coupled to other ports (e.g., serial port) and/or devices within the IHS 5 such that the BMC 75 may communicate by other means with a second IHS or with a plurality of IHSs. For example, the IHS 5 may be a remotely configured IHS which is connected via the network 70 to other remotely configured IHSs and to a remote management IHS.

Figures 2, 3:
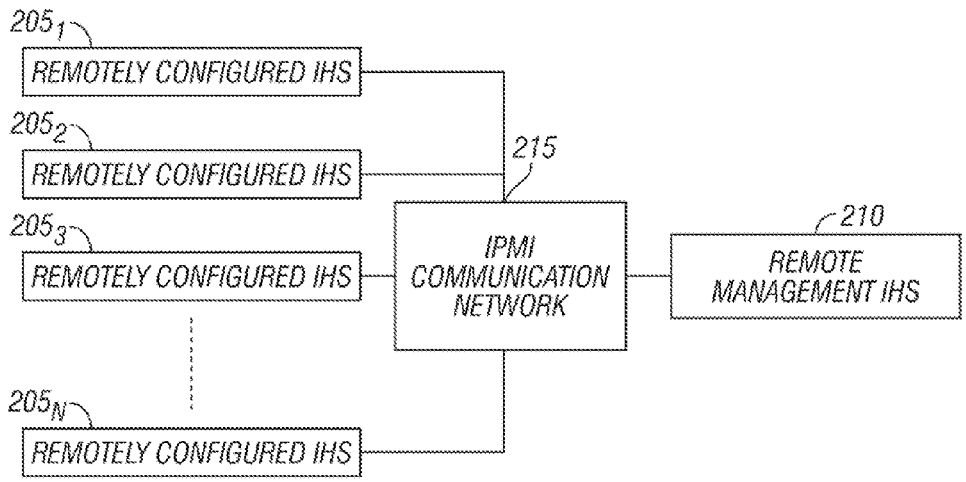
FIG. 2 illustrates an exemplary schematic containing a plurality of remotely configured information handling systems and a remote management information handling system according to the present disclosure.
FIG. 3 illustrates an exemplary boot table according to the present disclosure.

FIG. 2 illustrates one possible implementation of a plurality of remotely configured IHSs $205_{1-N}$ and a remote management IHS 210. The remotely configured IHSs $205_{1-N}$ and the remote management IHS 210 may contain the same components as the IHS 5 illustrated in FIG. 1 or may contain more or less components than the IHS 5 illustrated in FIG. 1. For example: each of the remotely configured IHSs may contain a BMC 75 to enable communication between each remotely configured IHS $205_{1-N}$ and the remote management IHS 210.

As illustrated in FIG. 2, the remote management IHS 210 may be coupled to each remotely configured IHS $205_{1-N}$ via an IPMI communication network 215. The IMPI communication network 215 may be any possible IPMI communication link between a remotely configured IHS and a remote management IHS. For example, the communication between a remotely configured IHS $205_1$ and a remote management IHS 210 may occur via a serial/modem connection, a local area network (LAN) connection, a PCI management bus connection, an intelligent chassis management bus connection, or the like. Furthermore, the use of the term network to describe the IPMI communications network 215 illustrated in FIG. 2 is not meant to be limiting of the means for the remote management IHS 210 to communicate with a remotely configured IHS $205_{1-N}$, or of the means for the remotely configured IHS $205_{1-N}$ to communicate with the remote management IHS 210.

The BMC may communicate via the IPMI communication network 215 the operational condition (e.g., temperature values, voltage values, etc.) and/or configuration of the IHS to the remote management IHS. The remote management IHS may send commands to the BMC 75 which in turn may cause the BMC via the IPMI communications network 215 to modify settings on the remotely configured IRS.

On first power up or on a restart, a remotely configured IHS $205_{1-N}$ (e.g., remotely configured IHS $205_1$) may execute code commonly known as a Basic Input/Output System (BIOS). The BIOS may prepare the remotely configured IHS such that an Operating System (OS) (e.g., Windows, Linux, etc.) may be loaded, executed, and assume control of the remotely configured IHS $205_1$. The code for the operating system may be loaded from a bootable device installed in or attached to the remotely configured IHS $205_1$. For example, a bootable device may be a hard drive, floppy drive, CD-ROM, network card, and the like. The BIOS may use a boot table to determine which bootable device will first attempt to load an operating system on the IHS. The boot table may contain a listing or hierarchy of bootable devices which are installed in the IHS, and the boot table may be stored in non-volatile memory 25. The boot table may be in a form and contain information as specified by the BIOS Boot Specification.

FIG. 3 illustrates an exemplary boot table 300 according to the present disclosure. The following discussion is set forth merely for the purpose of explanation and not limitation, to provide an understanding of one possible implementation of a boot table. It will be appreciated that other formats, arrangements, content, and all such variations are included within the scope of the present disclosure. As illustrated, the boot table 300 may contain a plurality of rows and the information within each row may correspond to a bootable device within an IHS (e.g., remotely configured IHS $205_1$). The boot table 300 may also contain a plurality of columns which contain information describing or corresponding to the bootable devices. For example, the first column of the boot table 300 may contain information which indicates a boot priority value corresponding to each bootable device. Together the boot priority values for each device in the boot table may indicate the order of devices in which the BIOS may attempt to load an OS from (i.e., to boot from). This order may be known as a boot order. For example, as illustrated in FIG. 3 the remotely configured IHS may initially attempt to load an OS from the SATA CD-RO M device first since it has a boot priority value of one. However, if for some reason the remotely configured IHS is unable to boot from the SATA CD-ROM (e.g. no bootable media is present in the SATA CD-ROM), according to the boot table 300 the remotely configured IHS may attempt to boot from the Hard Drive (C:) since the Hard Drive (C:) has a boot priority value of 2. The remotely configured IHS may continue to attempt to boot from the devices remaining in the boot table in the order specified by the priority value until the remotely configured IHS successfully boots from a bootable device.

The second column of the boot table 300 may contain information which indicates whether the bootable device is an initial program load (IPL) device which may boot and load an OS, or whether the bootable device is a boot connection vector (BCV) which points to device-specific code within memory which may be responsible for booting and loading an OS.

The third column of the boot table 300 may contain a unique signature for each bootable device within the IHS. The unique signature for each bootable device may be a value which distinctly identifies each bootable device within the remotely configured IHS. A unique signature value for a bootable device may be calculated for each bootable device within the remotely configured IHS. For example, the unique signature for a bootable device may be calculated by hashing the device's identification number, the devices vendor identification number, and at least a portion of the devices serial number. Lastly, the fourth column of the boot table 300 may contain device description strings corresponding to bootable devices. The device description string may contain information which describes a bootable device in a corresponding row.

A boot table may be viewed and modified locally by a user (e.g., via a keyboard, mouse and monitor directly connected to the remotely configured IHS). For example, a user may locally modify the boot order of the bootable devices by modifying the boot priority values corresponding to each bootable device. However, in an environment with many remotely configured IHSs, it may not be possible or desirable to attach a keyboard and a monitor to each individual remotely configured IHS in order to remotely configure the boot table. Consequently, it may be desirable to remotely configure the boot order of the devices within the remotely configured IHS, Aspects of the disclosure provide techniques and devices to remotely configure the boot order of devices within a remotely configured IHS and other boot options of the remotely configured IHS.

Figure 4:
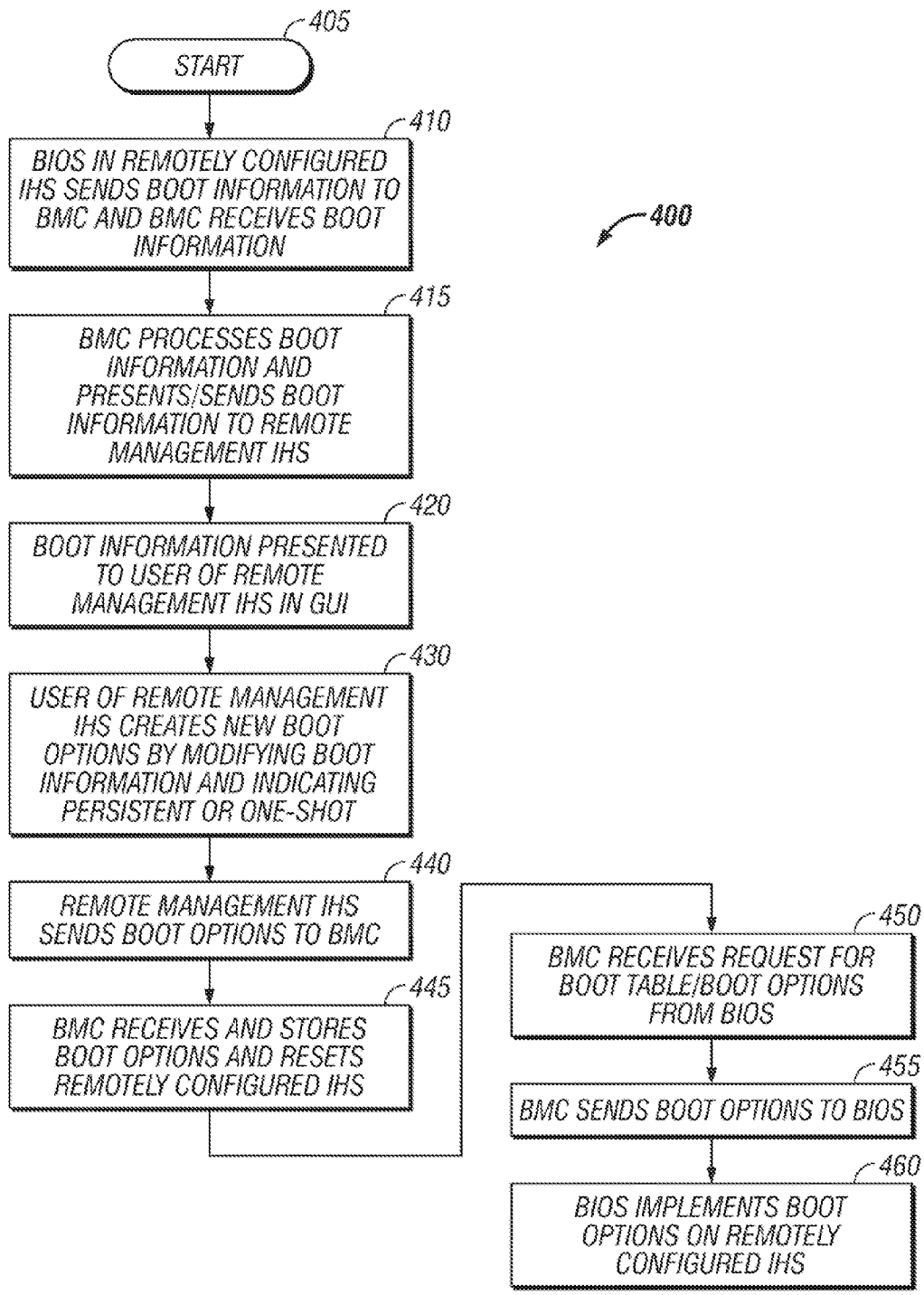
FIG. 4 is a flowchart which illustrates an exemplary method of remotely configuring boot options of a remotely configured information handling system according to the present disclosure.

FIG. 4 is a flowchart which illustrates an exemplary method 400 of remotely configuring the boot options of a remotely configured IHS according to the present disclosure. Various methods are contemplated including all or less than all of the steps shown in methods described herein (e.g., method 400) and/or mentioned below, any number of repeats or any of the steps shown and/or mentioned below, and in any order. The method 400 may begin at step 405 and may proceed to step 410 when the BMC 75 in a remotely configured IHS (e.g., remotely configured IHS $205_1$) receives boot information from the BIOS executing in the remotely configured IHS $205_1$. As will be described further below with respect to FIG. 6, the BIOS executing on the remotely configured IHS $205_1$ may send the most current boot information used by the BIOS to the BMC 75 in the remotely configured IHS $205_1$ during power-on-self-test (POST).

The most current boot information may include, for example, all of the information in the current boot table being used by the BIOS. However, according to other embodiments of the invention, the boot information sent from the BIOS to the BMC 75 may include only the unique signature of bootable devices in the remotely configured IHS, their corresponding priority order values, and their corresponding device description strings. By sending only the unique signatures, boot priority values, and devices description strings, the amount of data which needs to be sent between the BIOS and the BMC may be reduced.

Next, at step 415 the BMC may process the boot information and present or send the boot information to a remote management IHS (e.g., remote management IHS 210) via the IPMI communication network 215. After the remote management IHS 210 receives the boot information, in step 420 the remote management IHS 210 may present the boot information to a user of the remote management IHS. This information may be presented to the user of the remote management IHS 210 in a Graphical User Interface (GUI) application. The GUI may be any GUI which provides an interactive interface for the user of the remote management IHS 210 to view and modify the boot information of the remotely configured IHS $205_1$.

Figure 5:
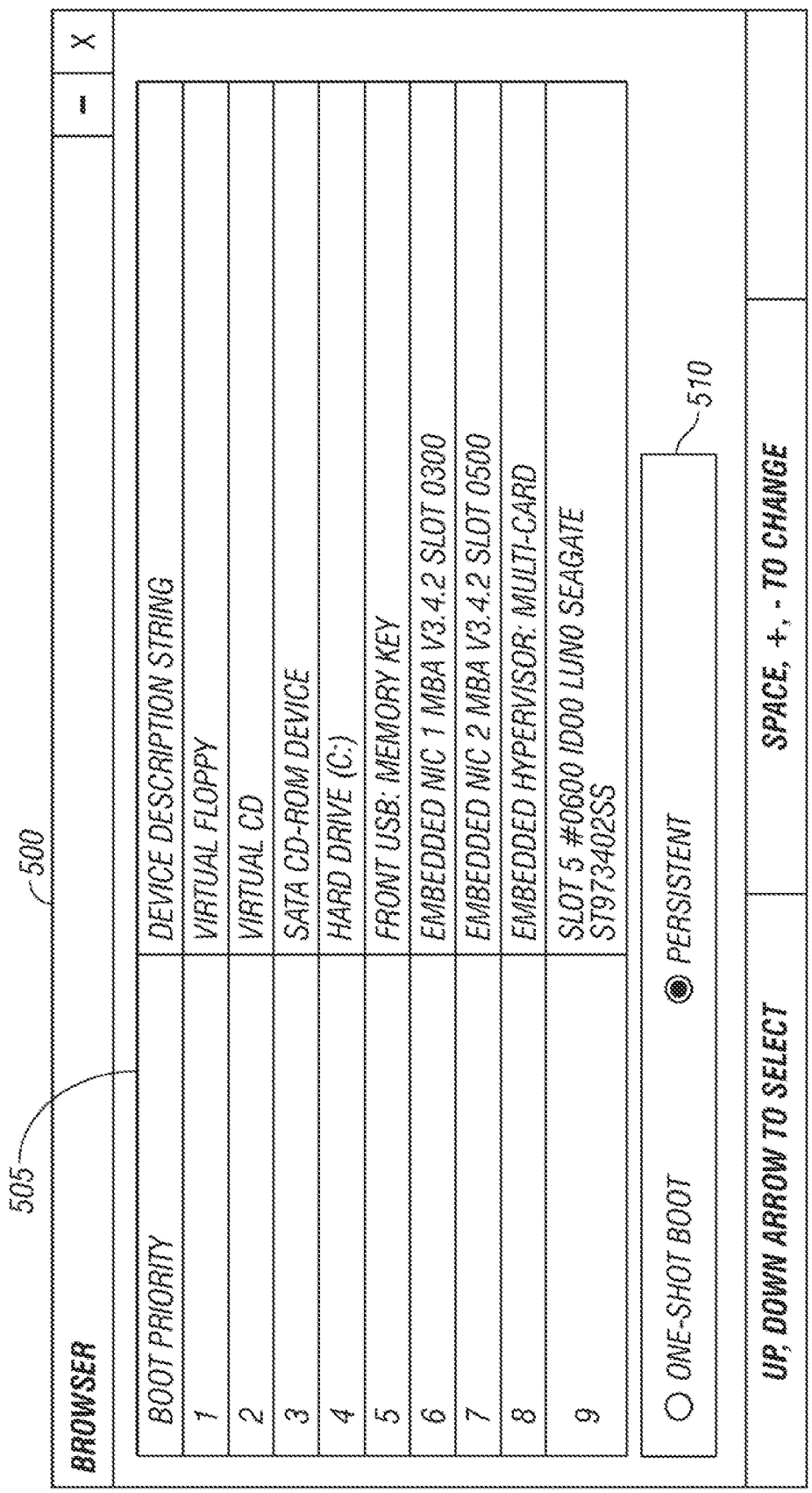
FIG. 5 illustrates an exemplary interface for configuring the boot options of a remotely configured information handling system according to the present disclosure.

For example, according to one implementation the GUI may be a browser. FIG. 5 illustrates an exemplary browser GUI 500 which may be used to view and modify the boot options of the remotely configured IHS $205_1$. The GUI 500 may present the boot information sent to the remote management IHS 210 from the BMC 75. For example, as illustrated the GUI 500 may show the user a list 505 of the bootable devices installed on the remotely configured IHS $205_1$. The list 505 shown to the user in the GUI 500 may also show the boot priority and the description string corresponding to each bootable device installed on the remotely configured IHS.

The GUI 500 may allow the user of the remote management IHS 210 to modify the boot priority of each bootable device. This modification may result in the modification of the boot order of the bootable devices on the remotely configured IHS $205_1$. Furthermore, the GUI 500 may provide the user of the remote management IHS an option to select whether the changes to the boot order are one-shot or are persistent. For example, as illustrated in FIG. 5 the GUI 500 may provide an option 510 for the user to indicate if the change to the boot order is one-shot or persistent. A one-shot boot may indicate a single device for the remotely configured IHS to attempt to boot from for only the next boot of the remotely configured IHS $205_1$. In contrast, a persistent boot order change may indicate a new boot order for all subsequent boots of the remotely configured IHS $205_1$.

Returning to method 400, after the boot table has been presented to the user of the remote management IHS 210, at step 430 the user of the remote management IHS 210 may use the GUI 500 to modify the boot order/boot table. The user of the remote management IHS 210 may modify the boot order by modifying the priority values and, consequently, the relative order of the bootable devices in the list 505. For example, as illustrated in the listing 505, the user of the remote management IHS may modify the boot table such that the virtual floppy is the first bootable device, the virtual CD is the second bootable device, the SATA CD-ROM device is the third bootable device, the hard drive is the fourth bootable device, the front USB Dell Memory Key is the fifth bootable device, and all other bootable devices are in the same order as in the boot table 300 illustrated in FIG. 3. Furthermore, in this example the user of the remote management IHS 210 has indicated that the changes to the boot order and, thus, the boot table on the remotely configured IHS $205_1$ are to be persistent. Together, the new boot order and the indication of whether the new boot order is to be persistent or ones shot may be referred to as boot options.

Next, at step 440 of method 400 the remote management IHS 210 may send the boot options to the BMC 75 installed in the remotely configured IHS $205_1$. The remote management IHS 210 may send the boot options to the BMC 75 via the IPMI communications network 215. According to one implementation, the boot options may specify a new boot order by sending the unique signature of the bootable devices and their new corresponding priority values. Furthermore, the boot options may specify a one-shot boot or a persistent boot order change. According to other implementations, the remote management IHS 210 may indicate a one-shot boot or a persistent boot order change by setting a pre-determined flag or bit in the boot information sent from the remote management IHS 210 to the BMC 75. For example, the information may indicate a one-shot boot by asserting a flag or bit (e.g., setting the flag or bit to a logical high level '1') and may indicate a persistent boot order change by de-asserting the flag or bit (e.g., setting the flag or bit to a logical low level '0'), or vice-versa.

At step 445 the BMC 75 may receive the boot options and store the received boot options. Furthermore, after receiving the boot options and storing the boot options, during step 445 the BMC 75 may reset the remotely configured IHS $205_1$. After the reset of the remotely configured IHS $205_1$ and during POST, the BMC 75 may receive a request for new boot options from the BIOS of the remotely configured IHS $205_1$ at step 450. The request from the BIOS for new boot options will be described further below with regards to FIG. 6. Next at step 455, the BMC 75 may send the boot options which were received in step 445 to the BIOS in response to the request. After receiving the boot options, the BIOS may implement the new boot options on the remotely configured IHS $205_1$ during step 460. Consequently, the remotely configured IHS $205_1$ may have its boot options remotely configured by a user of the remote management IHS 210.

Figure 6:
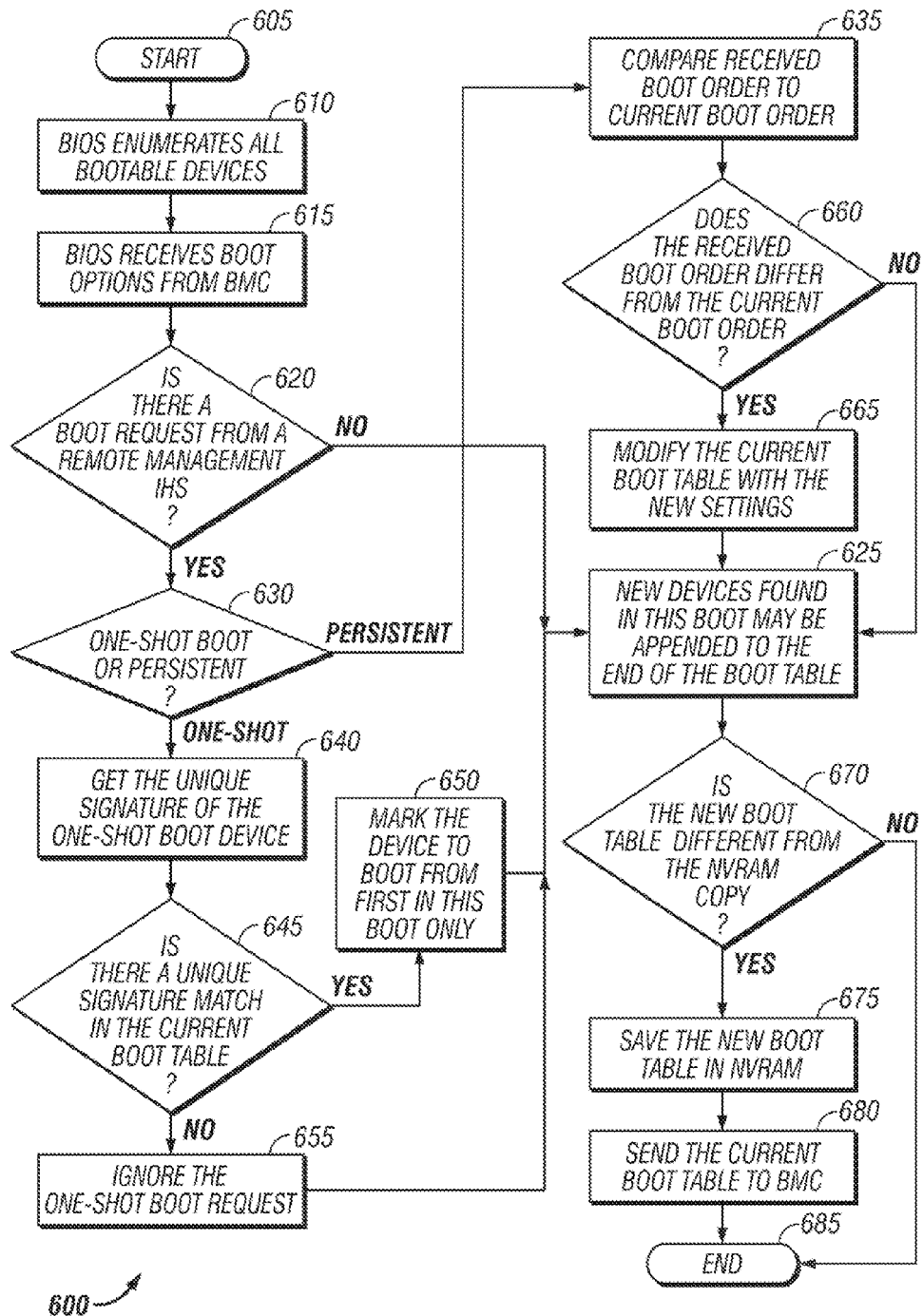
FIG. 6 is a flowchart which illustrates an exemplary method of communicating boot information between a BIOS and a BMC on a remotely configured information handling system and implementing new boot options on the remotely configured information handling system.

FIG. 6 is a flowchart which illustrates an exemplary method of communicating of boot information (e.g., boot table and boot options) between a BIOS executing on a remotely configured IHS (e.g., remotely configured IHS $205_1$) and a BMC 75, and implementing new boot options on the remotely configured IHS $205_1$. The method 600 starts at step 605 when the remotely configured IHS (e.g., remotely configured IHS $205_1$) has been reset or powered up and the BIOS executes Power-On Self Test (POST) on the remotely configured IHS $205_1$. POST may include initialization and verification of devices within the remotely configured IHS. The remotely configured IHS $205_1$ may have been reset by the BMC 75 during step 445 of method 400. That is, the remotely configured IHS $205_1$ may have been reset after the BMC 75 received new boot options from a remote management IHS 210. Next, at step 610 the BIOS may enumerate all bootable devices within the remotely configured IHS $205_1$. That is, the BIOS may identify all bootable devices which are installed in or are attached to the remotely configured IHS $205_1$.

Next, at step 615 the BIOS may query the BMC 75 located within the remotely configured IHS $205_1$ for boot options and may receive boot options from the BMC (e.g., as described above in step 450 of method 400). The BMC 75 may have boot options because it may have received boot options from a remote management IHS 210 via the IPMI communication network 215. For example, during step 440 of method 400 the BMC may have received boot options from a remote management IHS 210. As briefly described above, a user of a remote management IHS may have configured a new boot order for the remotely configured IHS $205_1$ and may have specified if the new boot order was persistent or a one-shot change. According to one implementation, the boot options received by the BIOS from the BMC may include the unique signature of a boot device and a boot priority of the boot device. Thus, the boot configuration information may indicate a new boot order for the remotely configured IHS. Furthermore, the boot configuration information may also indicate if the new boot order which was received is to be used for a one-shot boot (i.e., only for one boot of the remotely configured IHS) or whether the new boot order is persistent (i.e., to be used for all subsequent boots). However, according to other implementations, the boot options may include more or less information.

After receiving the boot options from the BMC 75, at step 620 the BIOS may determine if there is a boot request from a remote management IHS 210. If not, the BIOS may proceed to step 625 where new devices found during step 610 (i.e., devices found during enumeration of the bootable devices) may be appended to the end of the current boot table being used by the BIOS. However, if during step 620 the BIOS determines there is a boot request from a remote management IHS, the BIOS may proceed to step 630 to determine whether the boot options specify a one-shot boot or a persistent-boot order change. The BIOS may determine if the boot options specify a one-shot boot or a persistent boot, for example, by examining a pre-determined flag or bit in the information received from the BMC. If the BMC has requested a one-shot boot, the BIOS may proceed to step 640 where the BIOS will get the unique signature for the one-shot boot device from the received boot options.

Next, at step 645 the BIOS may compare the unique signature for the one-shot boot device received in the boot options to the unique signatures in the current boot table for the remotely configured IHS. The current boot table for the remotely configured IHS may be present in RAM. The BIOS may compare the unique signature in the boot options received from the BMC to the unique signatures in the current boot table in order to determine if the requested one-shot boot device is actually installed in the remotely configured IHS $205_1$. If the comparison of the received unique signature to the boot table results in a match: then the device to be used for the one-shot boot is installed on the remotely configured IHS $205_1$ and the BIOS may proceed to step 650 to mark the device as the bootable device during this boot only. However, during the comparison of step 645 the BIOS determines that the device is not installed on the remotely configured IHS $205_1$, the BIOS may proceed to step 655 and ignore the one shot boot request received by the BIOS from the BMC 75.

After either step 645 or step 655, the BIOS may proceed to step 625 where new devices found during step 610 (i.e. during enumeration of the bootable devices) may be appended to the end of the current boot table.

Returning to step 630, if the BIOS determines that the boot options indicate a persistent boot order change rather than a one-shot boot, the BIOS may proceed to step 635 to handle the persistent boot order change. During step 635 the BIOS may compare the boot order indicated in the boot options to the boot order specified in the current boot table. The BIOS may compare the boot order specified in the boot options to the current boot order by comparing the unique signatures and corresponding boot order priorities in the boot options with the unique signatures and corresponding boot order priorities within the current boot table.

Next, at step 660 the BIOS may determine if the received boot order specified in the boot options is different from the current boot order specified in the current boot table. This may be accomplished using the results of the comparison performed in step 635. If the comparison performed in step 635 indicates the received boot order is the same as the current boot order, then the BIOS may then proceed to step 625 where new devices found during step 610 (i.e., during enumeration of the bootable devices) may be appended to the end of the current boot table.

However, if during step 660 it is determined that the received boot order and the current boot order are different, the BIOS may then proceed to step 665 where the BIOS may modify the current boot order with the boot order specified in the boot options. That is, the BIOS may modify the current boot table to reflect the new boot order specified in the boot options. After modifying the current boot order the BIOS may proceed to step 625 where new devices found during step 610 may be appended to the end of the current boot table.

After appending the current boot table with any new devices in step 625, the BIOS may proceed to step 670 to determine if the boot table stored in NVRAM is the same as the current boot table. The determination of whether the boot table stored in NVRAM is the same as the current boot table may be performed via a comparison of the current boot table with the boot table stored in NVRAM. The boot table in NVRAM may differ from the current boot table if new devices were appended to the boot table in step 625 or if the current boot order was modified in step 665. If the boot table stored in NVRAM is different than the current boot table, the BIOS may proceed to step 675 to save the current boot table in NVRAM. After saving the current boot table in NVRAM the BIOS may proceed to step 680 to send the current boot table or boot information to the BMC 75 within the remotely configured IHS $205_1$. The BMC 75 may receive the current boot table as was described above with regards to step 410 of method 400. After sending the current boot table, the BIOS may proceed to step 685 where method 600 ends and the BIOS may continue POST.

By sending the current boot table to the BMC 75, the BMC 75 may receive information which defines the bootable devices present within the remotely configured IHS (e.g., unique signatures, device description string, boot priority values, etc.) and the boot order of the bootable devices. In response to receiving the boot information from the BIOS and as described in step 415 of method 400, the BMC 75 may communicate this information to the remote management IHS 210 such that a user of the remote management IHS 210 may view/modify the new boot order on the remotely configured IHS $205_1$.

However, if at step 670 the BIOS determines that the boot table stored in NVRAM is the same as the current boot table, the BIOS may proceed to step 685 where method 600 ends and the BIOS may continue POST without saving the current boot table in NVRAM. By determining if the received boot order is different than the current boot order and saving the boot order only when it is different, the BIOS may reduce the number of times the boot order is written to NVRAM.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, and/or use of equivalent functional junctions for couplings/links described herein.

What is claimed is:

1. A method of configuring boot options, comprising:
receiving on a remote management information handling system (IHS), boot information relating to a remotely configured IHS, wherein the boot information comprises information identifying a plurality of bootable devices installed on the remotely configured IHS, wherein the boot information comprises unique signatures identifying plurality of bootable devices, device description strings describing the bootable devices, and boot priority values together identifying a boot order;
presenting the boot information in a graphical user interface to a user of the remote management IHS;
allowing the user to modify the boot information in the graphical user interface to create boot options, wherein the boot options indicate a persistent boot order change or a one-shot boot order change;
sending the boot options from the remote management IHS to the remotely configured IHS;
and modifying a boot configuration of the remotely configured IHS based on the boot options.

2. The method of claim 1, wherein the boot information comprises information identifying the plurality of bootable devices installed on the remotely configured IHS and a plurality of boot priority values corresponding to bootable devices installed on the remotely configured IHS; and wherein the information identifying the plurality of bootable devices and their corresponding boot priority values make up a first boot order.

3. The method of claim 2, wherein the boot options comprise information identifying the plurality of bootable devices installed on the remotely configured IHS and a plurality of priority values corresponding to the plurality of bootable devices installed on the remotely configured IHS; and wherein the information identifying the plurality of bootable devices and their corresponding boot priority values make up a second boot order.

4. The method of claim 3, wherein the second boot order is different than the first boot order.

5. The method of claim 3, wherein the information identifying the plurality of bootable devices installed on the remotely configured IHS in the second boot order comprises a unique signature for at least one bootable device installed on the remotely configured IHS and a corresponding boot priority value.

6. The method of claim 1, wherein receiving boot information relating to a remotely configured IHS on a remote management IHS, comprises:
sending the boot information from memory of the remotely configured IHS to a baseboard management controller (BMC) installed in the remotely configured IHS;
sending the boot information from the BMC to the remote management IHS; and
receiving the boot information on the remote management IHS.

7. A non-transitory computer-readable medium containing computer executable instructions comprising:
a first instruction for receiving boot information relating to a remotely configured information handling system (IHS) on a remote management IHS, wherein the boot information comprises unique signatures corresponding to bootable devices installed in the remotely configured IHS, device description strings corresponding to the bootable devices, and priority values corresponding to the bootable devices; and wherein the boot information indicates a first boot order;
a second instruction for presenting the boot information in a graphical user interface to a user of the remote management IHS;
a third instruction for allowing the user to modify the boot information in the graphical user interface to create boot options, wherein the boot options indicate a persistent boot order change or a one-shot boot order change; and
a fourth instruction for sending the boot options from the remote management IHS to the remotely configured IHS.

8. The non-transitory computer-readable medium of claim 7, wherein:
the boot options comprise unique signatures corresponding to bootable devices installed in the remotely configured IHS, device description strings corresponding to the bootable devices, and priority values corresponding to the bootable devices; and
wherein the boot options indicate a second boot order.

9. The non-transitory computer-readable medium of claim 7, wherein the first instruction for receiving boot information relating to a remotely configured IHS on a remote management IHS comprises:
a first set of instructions for sending the boot information from memory of the remotely configured IHS to a baseboard management controller (BMC) installed in the remotely configured IHS;
a second set of instructions for sending the boot information from the baseboard management controller to the remote management IHS; and
a third set of instructions for receiving the boot information on the remote management IHS.

10. The method of claim 1, wherein modifying the boot configuration of the remotely configured IHS based on the boot options comprises:
comparing a boot order specified by the boot options to a current boot order specified in a current boot table saved in the remotely configured IHS; and
if the boot order specified by the boot options is different than the current boot order, saving the boot order specified by the boot options as the current boot order.

11. A system comprising:
a remote management information handling system (IHS) configured to present boot information in a graphical user interface to a user of the remote management IHS, the remote management IHS further configured to accept input related to the boot information from the user of the remote management IHS, and create boot options based on the input allowing the user to modify the boot information in the graphical user interface to create boot options, wherein the boot options indicate a persistent boot order change or a one-shot boot order change;
a communication network; and
a remotely configured IHS comprising:
memory;
a baseboard management controller (BMC) coupled to a communications network and configured to send the boot information via the communication network to the remote management IHS; and
a processor coupled to the memory and the BMC and configured to send boot information to the BMC, wherein the boot information comprises unique signatures identifying plurality of bootable devices, device description strings describing the bootable devices, and boot priority values together identifying a boot order.

12. The system of claim 11, wherein the remote management IHS is further configured to send the boot options to the BMC.

13. The system of claim 11, wherein the BMC is further configured to receive the boot options and, in response to receiving the boot options, store the boot options and reset the remotely configured IHS.

14. The system of claim 13, wherein after a reset of the remotely configured IHS, the processor may be further configured to query the BMC for the boot options and compare a boot order specified by the boot options to a boot order specified by a current boot table stored in the memory.

15. The system of claim 14, wherein the processor may be further configured to modify the current boot table stored in the memory if the boot order specified by the boot options differs from the boot order specified by the current boot table stored in memory.

16. The system of claim 14, wherein the processor may be further configured to attempt to load an operating system from a bootable device specified in the boot options.

* * * * *